(12) United States Patent
Brancolini

(10) Patent No.: US 6,572,201 B2
(45) Date of Patent: Jun. 3, 2003

(54) VEHICLE HYDRAULIC SYSTEM

(75) Inventor: Emiliano Brancolini, Modena (IT)

(73) Assignee: New Holland North America, Inc., New Holland, PA (US)

(*) Notice: Subject to any disclaimer, the term of this patent is extended or adjusted under 35 U.S.C. 154(b) by 0 days.

(21) Appl. No.: 09/909,647

(22) Filed: Jul. 20, 2001

(65) Prior Publication Data

US 2003/0015914 A1 Jan. 23, 2003

(51) Int. Cl.[7] ............................. B60T 8/18; B60T 11/00
(52) U.S. Cl. ................................ 303/9.69; 188/349
(58) Field of Search .............................. 188/345, 349; 303/9.69, 9.72, 9.74, 9.75

(56) References Cited

U.S. PATENT DOCUMENTS

| | | | | |
|---|---|---|---|---|
| 3,708,211 A | * | 1/1973 | Bueler | 303/6.01 |
| 3,806,207 A | * | 4/1974 | Reinecke et al. | 303/9.69 |
| 4,111,495 A | * | 9/1978 | Peeples | 303/9.69 |
| 4,198,099 A | * | 4/1980 | Oberthur | 303/6.01 |
| 4,302,056 A | * | 11/1981 | Kawaguchi | 303/6.01 |

* cited by examiner

Primary Examiner—Christopher P. Schwartz
(74) Attorney, Agent, or Firm—John William Stader; A. Nicholas Trausch; Rebecca L. Henkel

(57) ABSTRACT

A vehicle has a hydraulic utility system for supplying a pressurized fluid to a number of user devices, including two axles, each having at least one wheel; and a brake assembly for each of the axles; a valve being provided to feed the pressurized fluid of the hydraulic system directly to one of the two brake assemblies in response to a signal from the other of the two brake assemblies.

10 Claims, 4 Drawing Sheets

US 6,572,201 B2

VEHICLE HYDRAULIC SYSTEM

BACKGROUND OF THE INVENTION

This invention relates to a hydraulic system for a vehicle, such as a tractor, and, more particularly, a hydraulic utility system for supplying a pressurized fluid to a number of user devices on the vehicle, including two axles, each having at least one wheel; a brake assembly for each of the two axles; and a valve for selectively controlling operation of a first of the brake assemblies in response to a signal from a second of the brake assemblies.

The valve means normally comprise a tubular body with a longitudinal axis; and a piston fitted to slide axially inside the tubular body and shaped to define, together with the tubular body, a first, a second, and a third variable-volume chamber arranged successively in that order along the longitudinal axis.

More specifically, the first chamber receives the signal from the second brake assembly; the second chamber communicates with the hydraulic utility system; and the third chamber has an inlet communicating with an oil supply tank, and an outlet communicating with the first brake assembly.

In response to the signal from the second brake assembly, the piston is moved along the longitudinal axis to connect the second chamber to the hydraulic utility system, so that the total pressure exerted on the piston by the pressurized oil fed to the first and second chambers compresses the oil fed to the third chamber from the supply tank, so as to activate the first brake assembly.

A major drawback, therefore, of known vehicles of the above type lies in the valve means being relatively complex and expensive, by requiring a supply tank and a relatively large number of hydraulic connecting pipes, and therefore being difficult to install, especially on vehicles in which the first brake assembly is an optional as opposed to a standard part.

SUMMARY OF THE INVENTION

It is an object of the present invention to provide a vehicle, in particular a tractor, designed to eliminate the aforementioned drawbacks.

According to the present invention, there is provided a vehicle having a hydraulic utility system for supplying pressurized fluid to a number of user devices, including two axles, each having at least one wheel; and a brake assembly for each of the axles. A first valve mechanism feeds pressurized fluid directly to a first of said brake assemblies in response to a signal from a second of the brake assemblies.

These and other objects, features and advantages are accomplished according to the instant invention by providing a vehicle that has a hydraulic utility system for supplying a pressurized fluid to a number of user devices including two axles, each having at least one wheel; a brake assembly for each of the axles; and a valve to feed the pressurized fluid of the hydraulic system directly to one of the two brake assemblies in response to a signal from the other of the two brake assemblies.

BRIEF DESCRIPTION OF THE DRAWINGS

The advantages of this invention will become apparent upon consideration of the following detailed disclosure of the invention, especially when taken in conjunction with the accompanying drawings, wherein.

DETAILED DESCRIPTION OF THE PREFERRED EMBODIMENTS

Figure 1:
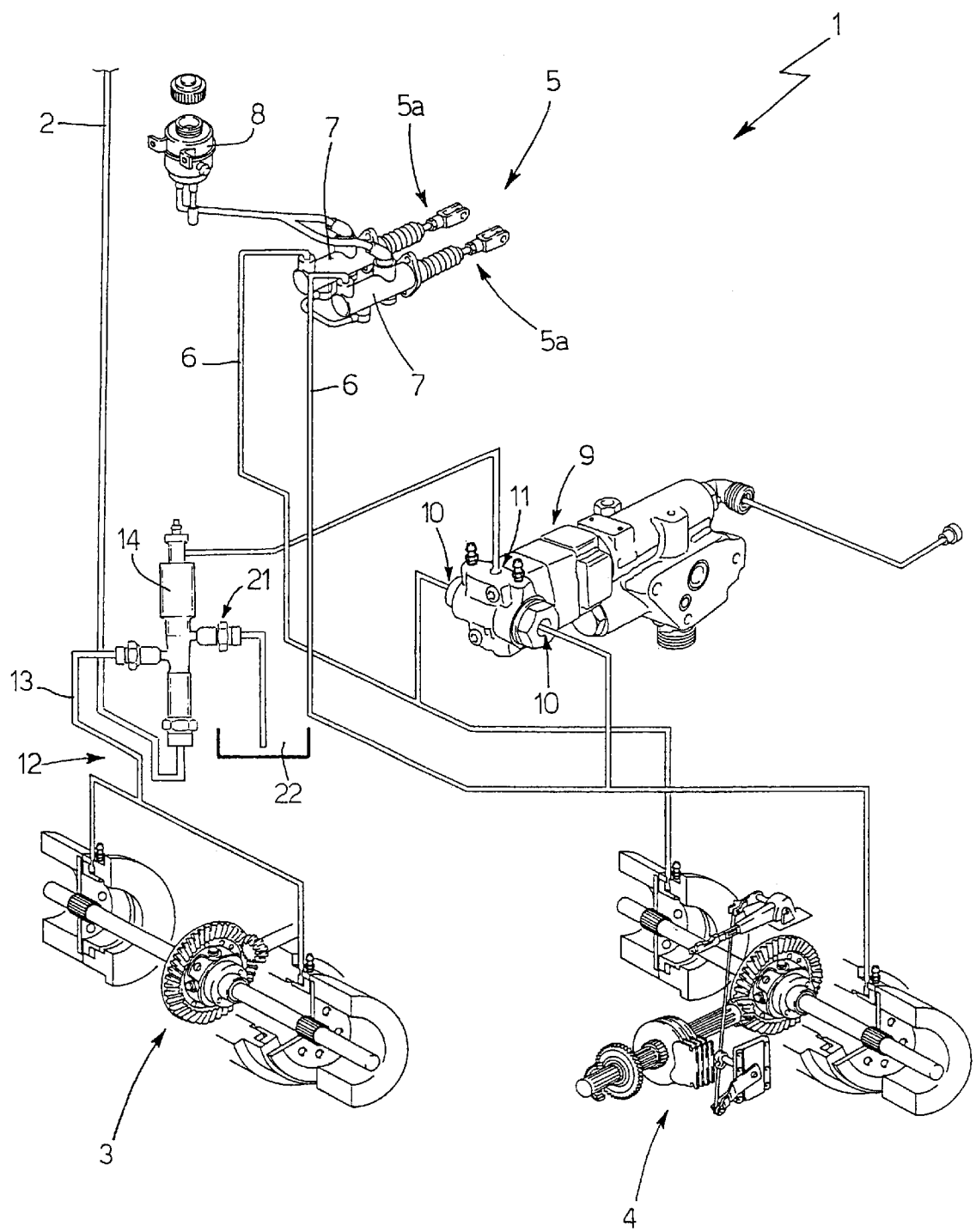
FIG. 1 shows a schematic view in perspective of a preferred embodiment of the vehicle according to the present invention.

A vehicle 1, incorporating the principles of the instant invention, is depicted in FIG. 1 and includes a hydraulic utility system 2 for supplying pressurized oil to a number of known conventional user devices (not shown) defined, for example, by transmission clutches and/or power take-off clutches of vehicle 1. The vehicle 1 also includes two axles 3 and 4, each of which would be provided with two conventional wheels (not shown); and a brake assembly 5 for braking the wheels (not shown) of axle 4.

The brake assembly 5 has two known brake devices 5a, each relative to a respective wheel (not shown) of axle 4, and each further having a conventional braking member (not shown) for braking the respective wheel (not shown), a circuit 6 for feeding pressurized oil to the respective braking member (not shown), and a main cylinder 7 for feeding pressurized oil to respective circuit 6. The vehicle 1 is also provided with a tank 8 for feeding oil to both cylinders 7, which are activated selectively and independently by respective known pedal controls (not shown); and a known timing valve 9 having two inlets 10, each communicating with one of circuits 6, and an outlet 11 communicating with a brake assembly 12 for braking the wheels (not shown) of axle 3. More specifically, valve 9 is designed to only allow both inlets 10 to communicate with outlet 11 when both devices 5 are activated by the operator.

Figure 2:
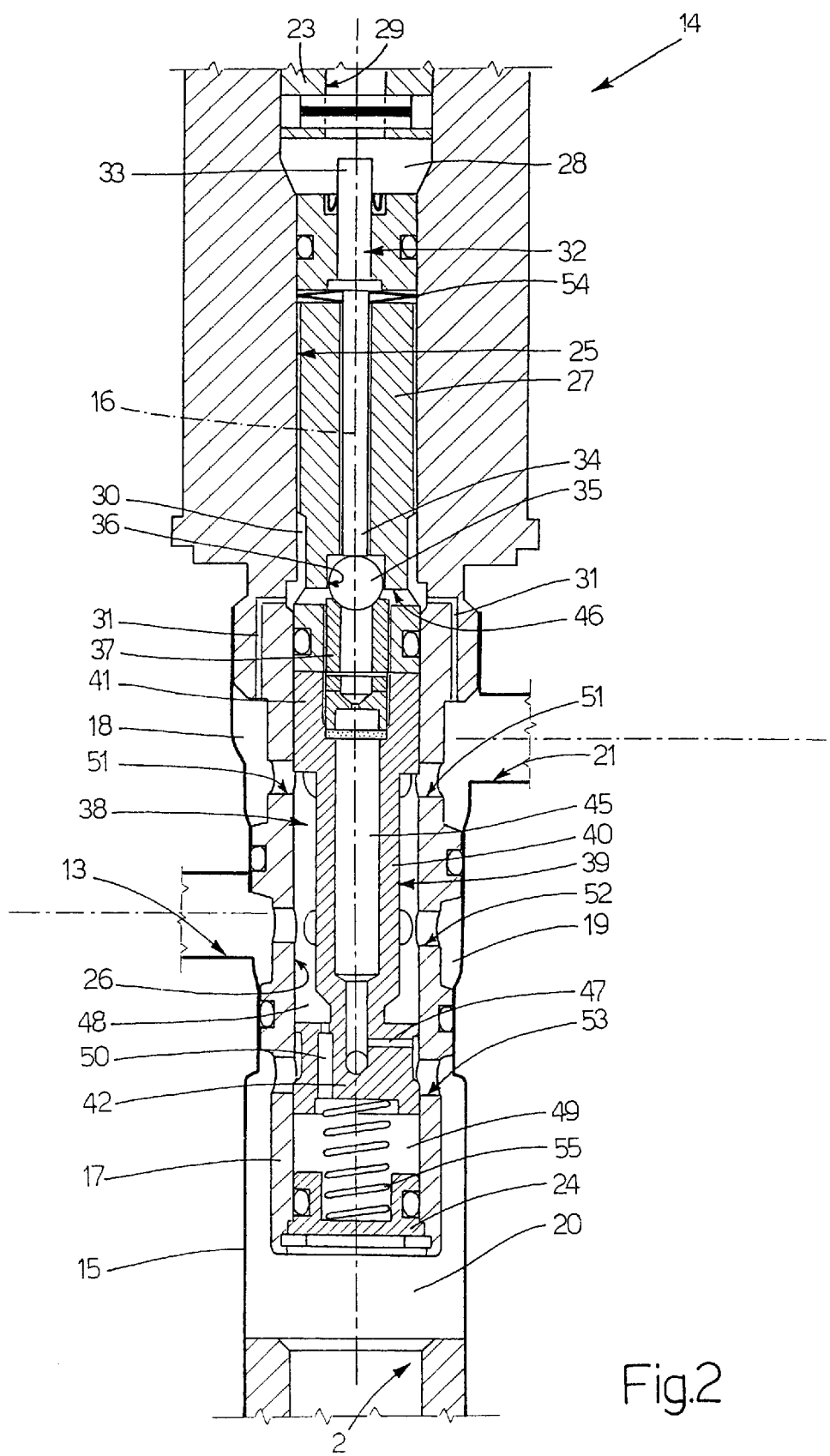
FIGS. 2 and 3 show two longitudinal sections of a detail of FIG. 1 in two different operating positions.
Figure 3:
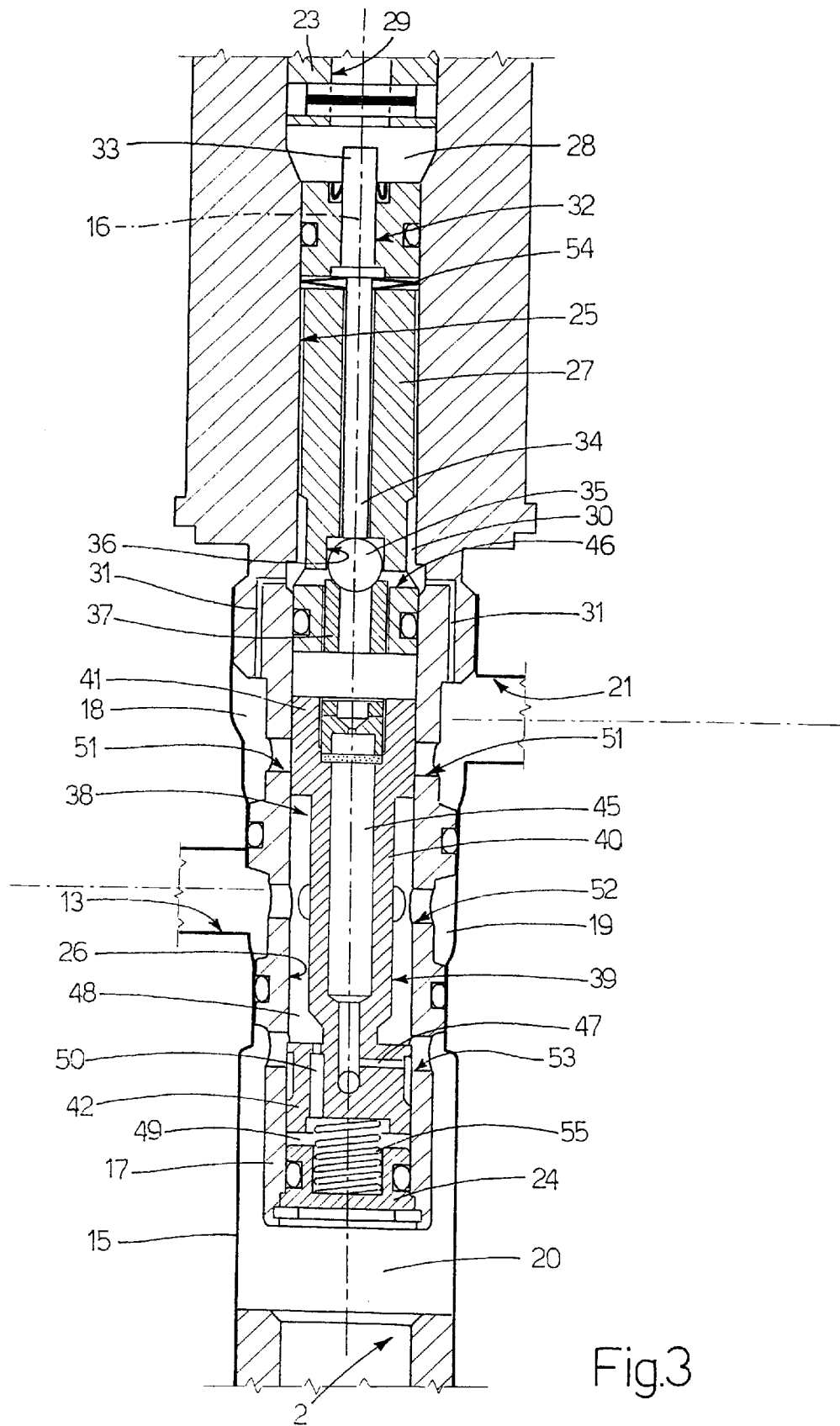

The brake assembly 12 is formed with two conventional braking members (not shown) for braking the respective wheels (not shown); a circuit 13 for feeding pressurized oil to the braking members (not shown); and a proportional valve 14 for connecting system 2 to circuit 13 in response to a signal from outlet 11 of timing valve 9. As best seen in FIGS. 2 and 3, the valve 14 includes a tubular supporting frame 15 having a substantially vertical longitudinal axis 16; and a tubular body 17 fitted in angularly and axially fixed manner to frame 15 and coaxial with axis 16. Together with the frame 15, the body 17 defines three chambers 18, 19, 20 arranged successively in that order along axis 16. Chamber 18 communicates, via an outlet 21, with a catch tank 22 (FIG. 1); chamber 19 communicates with circuit 13; and chamber 20 communicates with system 2.

The body 17 is defined at the top and bottom ends by respective closing members 23 and 24 oriented generally perpendicularly to axis 16, and includes a top portion 25 and a bottom portion 26 arranged successively along axis 16. The valve 14 also includes a sleeve 27, which is connected in an axially and angularly fixed manner to portion 25 and is coaxial with axis 16, which defines, together with body 17 and member 23, a substantially cylindrical chamber 28 communicating with outlet 11 via an inlet 29 formed through member 23, and further defines, together with body 17, an annular chamber 30 communicating with chamber 18 via a number of conduits 31 formed through body 17.

The sleeve 27 is engaged in axially sliding manner by a cylindrical push-rod 32, which has a top end 33 projecting axially inside chamber 28, and a bottom end 34 contacting a substantially spherical plug 35. The plug 35 is housed in a cylindrical cavity 36 formed radially on the inner surface of sleeve 27, and is supported underneath by a bushing 37 connected in axially and angularly fixed manner to the bottom end of sleeve 27.

The valve 14 also includes a slide 38 formed with a tubular body 39, which is coaxial with axis 16 and is mounted to slide axially inside portion 26, and defines a narrow central portion 40, and two wider end portions 41, 42 at opposite ends of portion 40. Together with body 17 and sleeve 27, the slide 38 defines a variable-volume chamber 45, which communicates with chamber 30, and hence outlet 21, via a number of holes 46 extending radially through sleeve 27, and communicates with chamber 20, and hence system 2, via a conduit 47 extending radially through portion 42.

Together with body 17, slide 38 also defines two chambers 48, 49 arranged successively along axis 16 and communicating with each other via a conduit 50 formed through portion 42 and parallel to axis 16. More specifically, chamber 49 is a variable-volume chamber; and chamber 48 communicates, as described in detail later on, with outlet 21, circuit 13 and system 2 via respective numbers of radial holes 51, 52, 53 formed through body 17.

Referring now to FIGS. 2 and 3, the operation of vehicle 1 includes first setting the timing valve 9 to a closed position wherein no pressurized oil is supplied by circuits 6 to chamber 28; push-rod 32 is set to a rest position contacting but exerting no pressure on plug 35; and slide 38 is set to a raised position wherein portion 41 substantially contacts sleeve 27. When the slide 38 is set to the raised position, the pressurized oil fed by system 2 to chamber 20 flows into chamber 45 through holes 53 and along conduit 47, flows along chamber 45, seeps between plug 35 and the seat defined by bush 37, and flows into chamber 30 through holes 46 and hence into chamber 18, i.e. outlet 21, along conduits 31; and circuit 13 communicates with outlet 21 via chamber 19, holes 52, chamber 48, holes 51 and chamber 18, so that any pressurized oil in circuit 13 is collected in tank 22.

Figure 4:
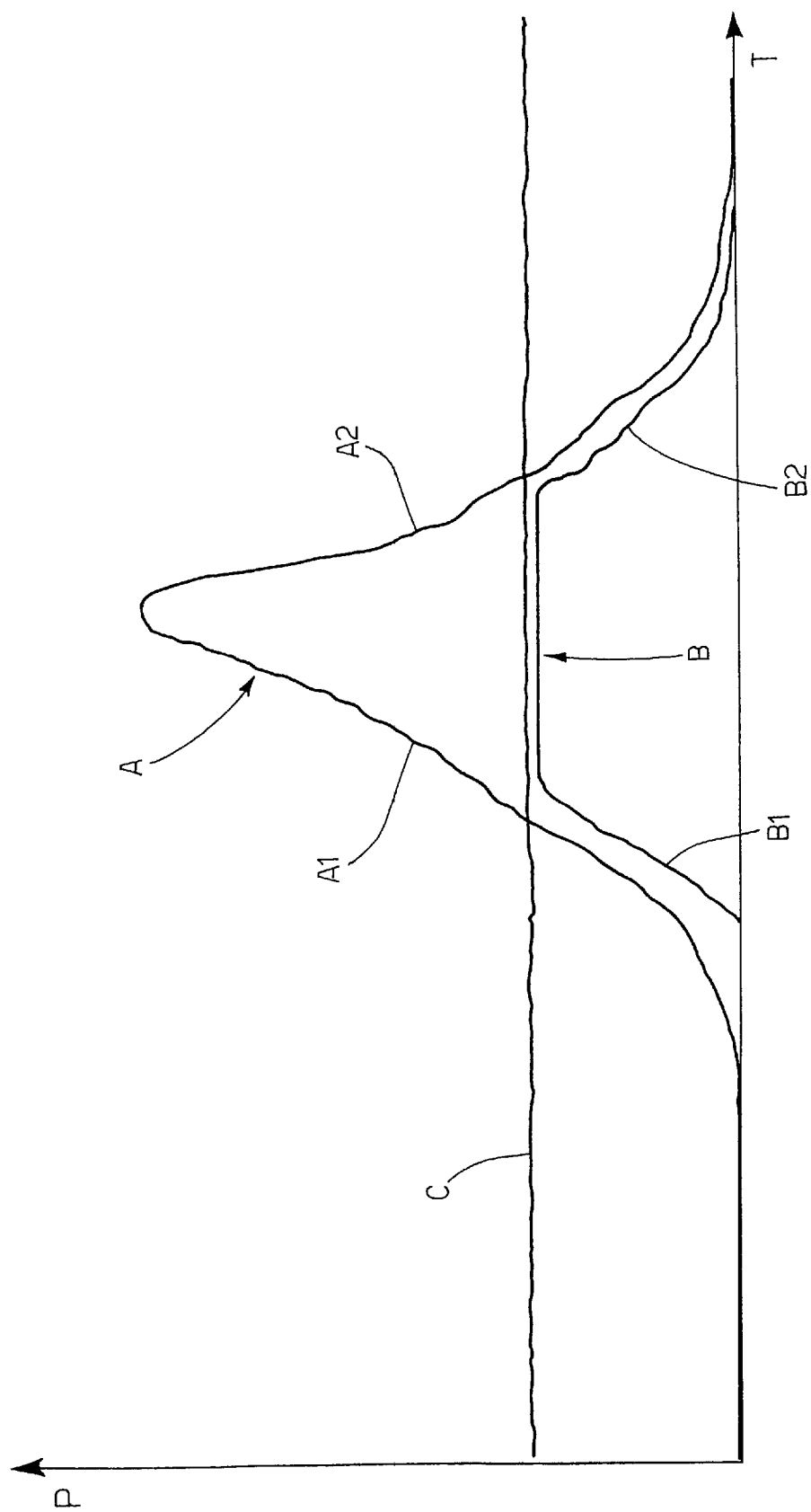
FIG. 4 shows a graph of the oil pressure in the two brake assemblies and in the hydraulic utility system of the FIG. 1 vehicle.

At this point, when both devices 5 for braking the wheels (not shown) of axle 4 are activated gradually (portion A1 of curve A in FIG. 4), the timing valve 9 moves into an open position in which circuits 6 communicate with chamber 28 to move push-rod 32, in opposition to a return spring 54, into a work position in which push-rod 32 exerts a given pressure on plug 35 to prevent the pressurized oil in chamber 45 from seeping into outlet 21 and, hence, into tank 22.

With reference to FIG. 3, the slide 38 is moved, by the pressurized oil in chamber 45 and in opposition to a return spring 55, into a lowered position in which the top portion 41 of body 39 is positioned to prevent circuit 13 from communicating with outlet 21, and hence with tank 22; and the bottom portion 42 of body 39 is positioned to connect chamber 48, and hence circuit 13, to chamber 20 to activate brake assembly 12 of axle 3.

In connection with the above-described operation, one skilled in the art will note that connecting conduit 50 allows the pressurized oil in chamber 48 to flow into chamber 49 and exert upward pressure on slide 38 in opposition to the downward pressure exerted on slide 38 by the pressurized oil in chamber 45. Valve 14 is therefore a proportional valve, which, as a function of the pressure applied by the operator on the pedal controls (not shown) of devices 5 for braking the wheels (not shown) of axle 4, allows the pressure of circuit 13 to increase gradually (portion B1 of curve B in FIG. 4) up to the maximum pressure (curve C in FIG. 4) of hydraulic utility system 2 of vehicle 1.

Portion A2 of curve A and portion B2 of curve B show the pressure in circuits 6 and 13 respectively when the pedal controls (not shown) are released. Valve 14, therefore, does not require an additional tank from which to draw pressurized oil to activate brake assembly 12 of axle 3, by assembly 12 being activated directly, by means of valve 14, by the pressurized oil supplied to circuit 13 by the hydraulic utility system 2 of vehicle 1.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention. Accordingly, the following claims are intended to protect the invention broadly as well as in the specific form shown.

Having thus described the invention, what is claimed is:

1. In a vehicle having a hydraulic utility system for supplying pressurized fluid to a number of user devices, including first and second axles, each having at least one wheel; and first and second brake assemblies, one for each of said respective axles, the improvement comprising:

said second axle having two wheels and said brake assembly including first and second braking devices, one for each of the respective wheels on said second axle and further having first and second operator-activated pedal controls, one connected to each said braking device for braking each of said two wheels, each pedal control generating a signal upon activation; and said hydraulic utility system further including a first valve mechanism feeding said pressurized fluid directly to said first brake assembly to brake said first at least one wheel of said first axle in response to generally simultaneous signals from both of said first and second operator-activated pedal controls of said second brake assembly.

2. The vehicle of claim 1 wherein said first valve mechanism includes a supporting apparatus; and a slide movable along the supporting apparatus between a closed position in which said hydraulic utility system is cut off hydraulically from said first brake assembly, and an open position in which the hydraulic utility system communicates with the first brake assembly.

3. The vehicle of claim 2 wherein said hydraulic utility system further including a second valve mechanism being interposed between said first brake assembly and said second brake assembly to move said slide into the open position when both said first and second braking devices are activated.

4. The vehicle of claim 3 wherein said slide defines, together with said supporting apparatus, a first chamber and a second chamber communicating with said hydraulic utility system when the slide is in the open position.

5. The vehicle of claim 4 wherein, when said slide is in the open position, the pressurized fluid in said first and second chambers moves the slide into the open and closed positions, respectively, with a first and second thrust respectively; said first and said second chambers being configured that said first thrust is greater than said second thrust.

6. The vehicle of claim 5 wherein said second brake assembly supplies a further supply of pressurized fluid to said first valve mechanism, the first valve mechanism being configured to prevent said pressurized fluid and said further pressurized fluid from coming into contact with each other.

7. In a vehicle having a hydraulic utility system for supplying pressurized fluid to a number of user devices, including first and second axles, each having at least one wheel; and first and second brake assemblies, one for each of said respective axles, the improvement comprising:

said second axle and further two wheels and said second brake assembly including first and second braking devices, one for each of the respective wheels on said second axle and further having first and second operator-activated pedal controls, one connected to each said braking device for braking each of said two wheels, each pedal control generating a signal upon activation;

said hydraulic utility system further including first and second valve mechanisms, said first valve mechanism feeding said pressurized fluid directly to said first brake assembly to brake said first at least one wheel of said first axle in response to generally simultaneous signals from both of said first and second operator-activated pedal controls of said second brake assembly; said first valve mechanism including a supporting apparatus; and a slide movable along the supporting apparatus between a closed position in which said hydraulic utility system is cut off hydraulically from said first brake assembly, and an open position in which the hydraulic utility system communications with the first brake assembly; and, said second valve mechanism being interposed between said first brake assembly and said second brake assembly to move said slide into the open position when both said first and second braking devices are activated.

8. The vehicle of claim 7 wherein said slide defines, together with said supporting apparatus, a first chamber and a second chamber communicating with said hydraulic utility system when the slide is in the open position.

9. The vehicle in claim 8 wherein, when said slide is in the open position, the pressurized fluid is said first and second chambers moves the slide into the open and closed positions, respectively, with a first and second thrust respectively; said first and said second chambers being configured that said first thrust is greater than said second thrust.

10. The vehicle of claim 9 wherein said second brake assembly supplies a further supply of pressurized fluid to said first valve mechanism, the first valve mechanism being configured to prevent said pressurized fluid and said further pressurized fluid from coming into contact with each other.

* * * * *